United States Patent [19]

Hayata

[11] 4,171,887
[45] Oct. 23, 1979

[54] LENS-ADJUSTABLE FLASH CAMERA
[75] Inventor: Toshinori Hayata, Osaka, Japan
[73] Assignee: West Electric Company, Ltd., Osaka, Japan
[21] Appl. No.: 825,433
[22] Filed: Aug. 17, 1977
[30] Foreign Application Priority Data
Aug. 20, 1976 [JP] Japan .................... 51-99951
[51] Int. Cl.² .................. G03B 3/00; G03B 13/12; G03B 15/03
[52] U.S. Cl. .................. 354/126; 354/199; 354/221; 354/289
[58] Field of Search ........... 354/126, 139, 149, 199, 354/219, 221, 289

[56] References Cited
U.S. PATENT DOCUMENTS

| | | | |
|---|---|---|---|
| 3,212,422 | 10/1965 | Merwin et al. | 354/199 |
| 3,488,486 | 1/1970 | Bretthauer | 354/126 |
| 3,836,934 | 9/1974 | Suzuki et al. | 354/199 X |
| 3,882,514 | 5/1975 | Graham | 354/149 |

*Primary Examiner*—Michael L. Gellner
*Attorney, Agent, or Firm*—Cushman, Darby & Cushman

[57] ABSTRACT

A camera is provided with a flash device and a selectively engagable lens adjusting arrangement such as a telescopic conversion lens. A view finder angle adjusting mechanism such as a periphery masking frame is provided and is connected through a linkage to the lens adjusting arrangement, so that a view finder angle corresponding to the angle of the lens being used is provided. The camera includes a beam angle adjusting means such as a Fresnel lens associated with the flash device, so that the beam angle of light from the flash device can be adjusted to correspond to the angle of the lens being used.

8 Claims, 11 Drawing Figures

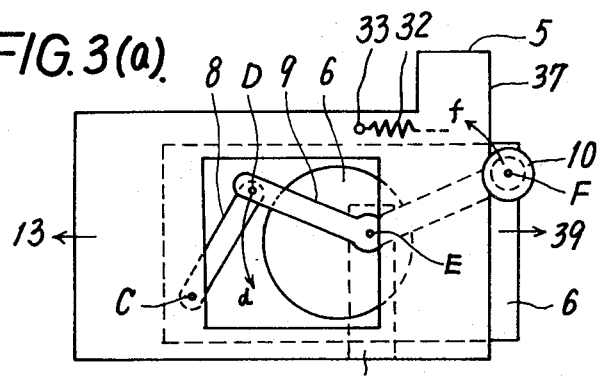
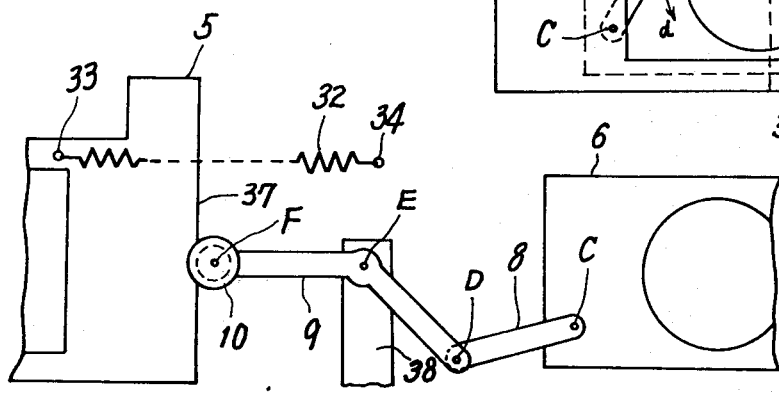
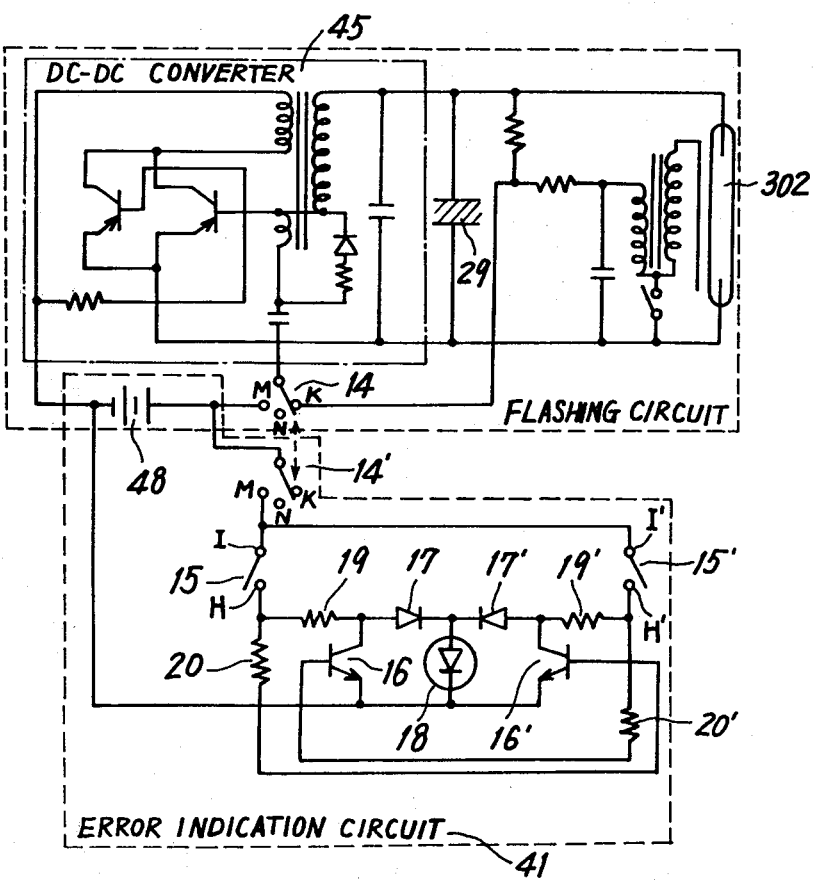

LENS-ADJUSTABLE FLASH CAMERA

BACKGROUND OF THE INVENTION

This invention relates to a lens-adjustable flash camera and particularly concerns a camera provided with a flashing device and a lens-adjusting means and further capable of changing beam angle of flash light, so as to illuminate appropriate photographic scene corresponding to a photographing angle of a photographing lens.

Flash cameras provided with built-in strobo-flash device have been widely used. With such cameras, photographings in dark scene become very much easier than with conventional standard cameras wherein a flash device must be mounted on a camera and stop of lens and exposure time must be selected taking account of distance of the object. Namely, with the flash cameras, the adjustments of stop and exposure time in relation with the distance have been automatically made.

However, in such camera with built-in flash device, the flash device has been designed for use only with a standard lens of standard focal length. Accordingly, when an auxiliary or adaptor lens for converting the focal length of the photographing lens of the camera or photographing angle of the photographing lens are used, and a photography of narrower scene or wider scene than the standard scene by the standard lens is taken with the built-in flash device unadjusted, the angle of flash light beam is too narrow or too wide for the scene by the adjusted lens. Therefore, defective photographing with flash light illumination only at central part of the scene or too long exposure time due to redundant wide angle lighting takes place.

SUMMARY OF THE INVENTION

The object of the present invention is to provide a novel flash camera wherein angle of view finder is automatically adjusted in response with adjusting of photographing lens, and furthermore, angle of beam of flash light is adjustable so as to respond with the angle of the photographing lens.

BRIEF EXPLANATION OF THE DRAWING

The abovementioned FIGS. 1(a) and 1(b) are for a state of photographing without an auxiliary lens 6.

The abovementioned FIGS. 2(a) and 2(b) are for a state of photographing with the auxiliary lens 6.

FIG. 3, (a) and (b) are front view of linkage means linking between the auxiliary lens 6 and the finder angle adjusting means 5, wherein:

FIG. 3(a) is for the state of photographing without the auxiliary lens 6 and;

FIG. 3(b) is for the state of photographing with the auxiliary lens 6.

FIG. 4 is a circuit diagram of the camera of the present invention.

DETAILED DESCRIPTION OF THE INVENTION

Figure 1A:
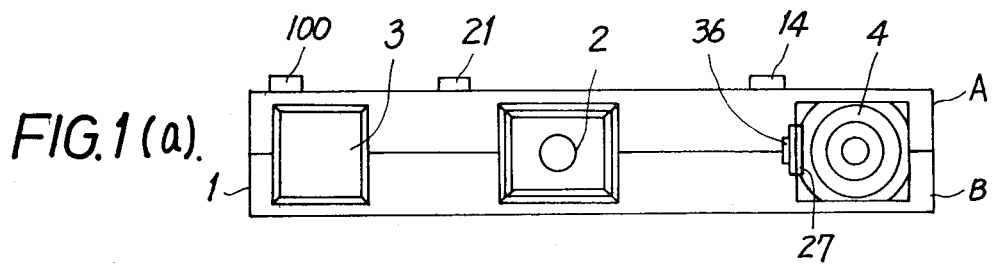
FIG. 1(a) and FIG. 2(a) are front views of a flash camera embodying the present invention.
Figure 1B:
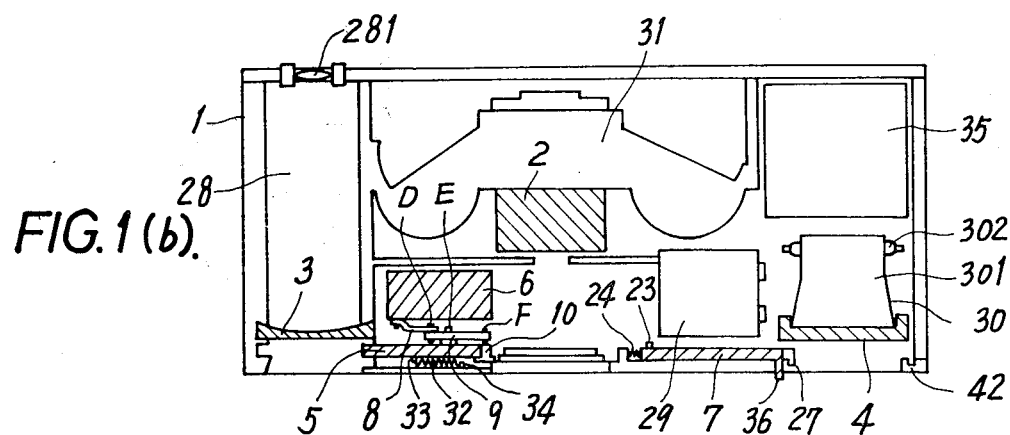
FIG. 1(b) and FIG. 2(b) are plan views of the flash camera of FIGS. 1(a) and 2(a), respectively, with lid A removed.
Figure 2A:
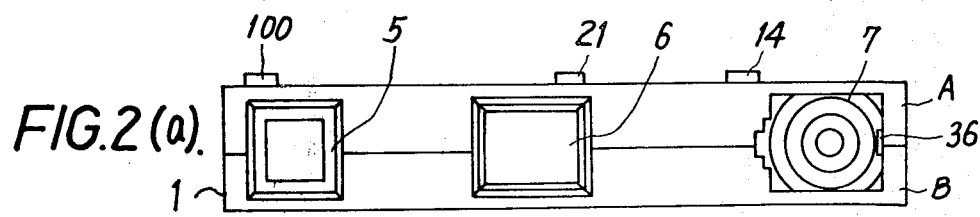
Figure 2B:
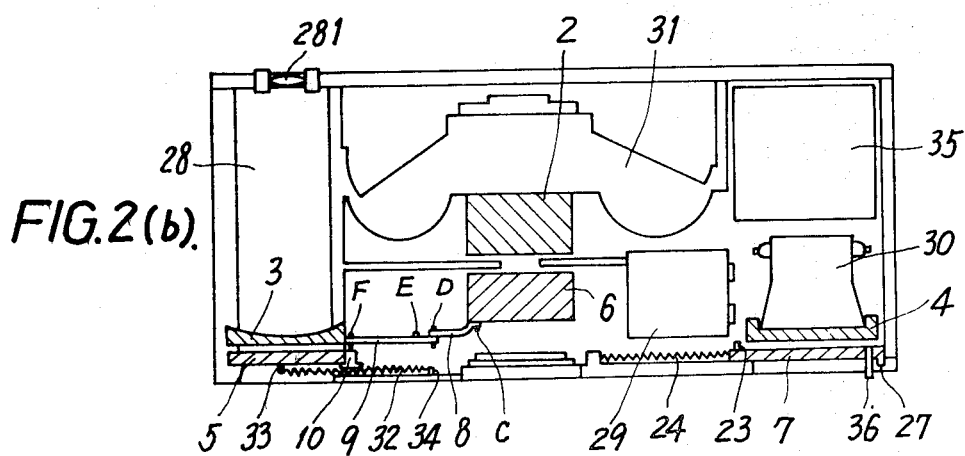

The general construction of a camera embodying the present invention is shown by front views FIG. 1(a) and FIG. 2(a) for states of photographing without and with auxiliary lens 6, respectively, and by plan views with a lid A removed of FIG. 1(b) and FIG. 2(b) without and with auxiliary lens 6, respectively.

A case of the camera consists of a body B and the lid A. Almost parts included in the case are mounted on the body B. A lens adjusting knob 21 linked to drive a lens-adjusting means 6, a known shutter release button 100 and a power switch 14 of a built-in flash device are provided on the top face of the lid A.

The body B of the case comprises therein a film magazine installing space 31, a standard lens 2, a finder 28 including an objective lens 3 and an eye piece lens 281, the lens-adjusting means 6, e.g. a telescopic or wide-angle conversion lens or a weak-convex focus adjusting lens, an electric circuit 35 of the built-in flash device, main charge-storing capacitor 29 of the flash device and a flash lamp 30. The flash lamp 30 includes strobo lamp tube 302, for example, a small-sized xenon lamp tube, a reflector 301 and a first Fresnel lens 4. The reflector 301 and the first Fresnel lens 4 cooperatively converges the light of the lamp 302 in a manner that the angle of the light beam is appropriate for illuminating the photographic object for said standard lens 2. A beam angle-adjusting panel 7, for example, a gentle convex or concave Fresnel lens is disposed slidably, along the bottom of the case body B, in front of the flash lamp 30. The beam angle adjusting panel 7 usually rests in the left portion of its sliding path as shown in FIG. 1(a) and FIG. 1(b). The beam angle adjusting panel 7 is manually drawn rightward by pulling the knob 36 and is set there by engaging a detent 27 to the indent 42 on the body B as shown in FIG. 2(a) and FIG. 2(b), and makes the flash light beam slightly converge or deverge, so that a desired beam angle corresponding to the scenery to be photographed is obtainable.

The lens-adjusting means 6 is disposed slidably in front of the standard lens 2 along the bottom of the case body B. The lens-adjusting means 6 usually rests in the left position of its sliding path as shown in FIG. 1(a) and FIG. 1(b).

A view finder angle adjusting means 5, for example a periphery masking frame, a weak convex lens or a weak concave lens is disposed slidably in front of the finder 28 along the bottom of the case body B. The finder angle adjusting means 5 usually rests in the right position of its sliding path as shown in FIG. 1(a) and FIG. 1(b).

The view finder angle adjusting means 5 is mechanically linked with the lens-adjusting means 6 by a connecting rod 8 and a lever 9, in order that the view finder angle adjusting means 5 is driven leftward to a set position in front of the view finder 28 when the lens-adjusting means 6 is driven rightward as shown in FIG. 2(a) and 2(b) by the knob 21 into a set position in front of the standard lens 2.

The detailed construction of the mechanical linkage means between the lens-adjusting means 6 and the view finder angle adjusting means 5 is elucidated referring to FIG. 3(a) and FIG. 3(b). One end of the connecting rod 8 is pivotted to a fulcrum pin C on the lens-adjusting means 6 and the other end of the connecting rod 8 is pivotted to a pin D at one end of a rotatable lever 9 which is pivotted by a fulcrum pin E of a supporter 38 fixed to the body B. The other end of the lever 9 has a pivotted sliding wheel 10 which slidably engages right vertical edge 37 of the view finder angle adjusting means 5, which is always pulled rightward by a tension spring 32 hooked between a pin 33 on the view finder angle adjusting means 5 and a pin 34 on the body B of the case.

FIG. 3(a) shows the non-adjusted resting state corresponding to the case of FIG. 1(a) and FIG. 1(b), and FIG. 3(b) shows the adjusted state corresponding to the case of FIG. 2(a) and FIG. 2(b). When the knob 21 is pushed rightward thereby driving the lens-adjusting means 6 rightward to the set position, the fulcrum point C moves rightward, and therefore the point D rotates counterclockwise as shown by an arrow "d" and resultantly the sliding wheel 10 moves as indicated by an arrow "f" and pushes the vertical edge 37 of the view finder angle adjusting means 5 rightward as shown in FIG. 3(b). When the knob 21 is driven back leftward, the lens-adjusting means 6 and the view finder angle adjusting means 5 goes back to the resting positions of FIG. 1(a) and FIG. 1(b).

Figure 6:
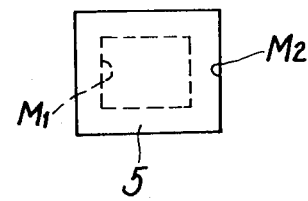
FIG. 6 shows relation between the sizes of a standard and narrower finder frame.

Therefore, when the view finder angle adjusting means 5 is the peripheral masking frame, the scenery seen in the view finder is narrowed as indicated by a dot line M1 of FIG. 6 contrasted to the scenery indicated by a solid line M2 of FIG. 6 seen without the masking frame 5.

Figure 5A:
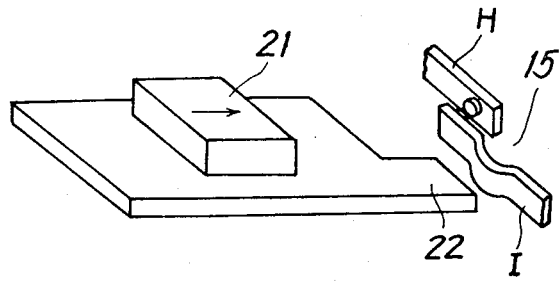
FIG. 5(a) shows a construction of a first limit switch 15.

A failsafe means against inadvertent maloperation of the beam angle adjusting means 7 is provided as follows:

A limit switch 15 shown in FIG. 5(a) is disposed at the right end of the knob 21. The switch 15 has a fixed contact plate H and a moving contact plate I which is to be pushed by an end tip 22 of the knob 21. Therefore, when the knob 21 of the lens-adjusting means 6 is driven rightward as indicated by the arrow "k" in FIG. 5(a) to adjust the lens, the switch 15 is closed.

Figure 5B:
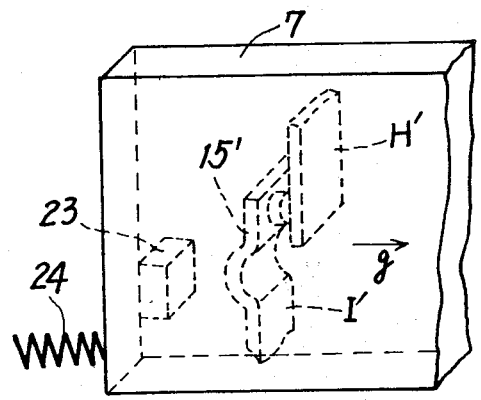
FIG. 5(b) shows a construction of a second limit switch 15'.

Another limit switch 15' shown in FIG. 5(b) is disposed at the vicinity of the beam angle adjusting means 7. The switch has a fixed contact plate H' and a moving contact plate I' which is to be pushed by a riser 23 at the end of the beam angle adjusting means 7. Therefore, when the beam angle adjusting means 7 is driven rightward as indicated by an arrow "g", the switch 15' is closed.

The switch 15 and 15' are connected in an error indication circuit 41, which is connected through interlocked switches 14 and 14' to a known flashing circuit 44, which comprises the strobo lamp tube 302, the main discharging capacitor 29, a known DC-DC converter 45 and a battery 48. The interlocked switches 14 and 14' are thrown to the contacts M for charging the capacitor 29, to the contacts K for discharging and to the contact N for non-flash photographing. The error indication circuit 41 is a symmetry circuit having a pair of transistors 16 and 16' connected by their bases, through the resistors 20' and 20, to the limit switches 15' and 15, respectively. The switches 15 and 15' are also connected, through the resistors 19 and 19', to the collectors of the transistors 16 and 16', respectively. Across the collectors and the emitters of the transistors 16 and 16', a light emitting diode 18 disposed in a view finder or suitable place on the case is commonly connected through diodes 17 and 17' to respective collectors of the transistors 16 and 16'.

The symmetry circuit constitutes an "Exclusive OR" logic gate which puts the light emitting diode on only when either one of the switch 15 and 15' is closed and the other is open. The operation of the error indication circuit 41 is as follows:

When both switches 15 and 15' are closed:

Current flows from the source battery 48, through the contact M of the switch 14, to both switches 15 and 15', and then, through the resistors 20 and 20', to the bases of the transistors 16' and 16, respectively. Therefore, both transistors 16 and 16' become ON. Accordingly, no current flows through the light emitting diode 18, thereby making it OFF.

When both switches 15 and 15' are open:

Since path to the error indication circuit 41 is cut out by the switches 15 and 15', the light-emitting diode 18 is OFF.

When either one switch is closed:

When the switch 15 is closed and the switch 15' is open, the current does not flow into the base of the transistor 16, and therefore, transistor 16 is OFF, and the transistor 16' only is ON. Since the switch 15 is closed, a current flows, through the switch 15, resistor 19 and diode 17 to the light-emitting diode 18. The diode 17' is made OFF since the transistor 16' is ON, hence impressing backward voltage across its anode and cathode. Therefore, the light-emitting diode 18 is lit by the current through the diode 17. Since the circuit 41 is symmetry with respect to the switches 15 and 15', the light-emitting diode 18 is lit also when the switch 15 is open and the switch 15' is closed.

Accordingly, when the light-emitting diode 18 is lit, it indicates either of the following cases:

(1) The lens-adjusting means 6 is set to alter the lens characteristic from that of the standard lens 2, while the flashing circuit 44 is preparing for a flash without necessary setting of the beam angle adjusting means 7 for the altered lens characteristic. In such case, the beam angle adjusting means 7 should be set in order to remove a defective photographing; or (2) The flashing circuit 44 is preparing for a flash with the beam angle adjusting means 7 set for the altered lens characteristic, while the lens-adjusting means 6 is not set. In such case, the beam angle adjusting means 7 should be reset in order to remove a defective photographing.

Figure 7:
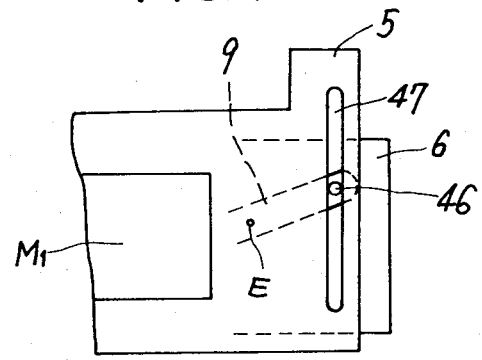
FIG. 7 shows a modified example of the linkage means between the auxiliary lens 6 and the finder angle adjusting means 5.

FIG. 7 shows a modified example of the slidable engaging means at the end of the lever 9 of FIG. 3, (a) and (b). In this example, a vertical slot 47 is formed on the view finder angle adjusting means 5 and a pin 46 at the end point F of the lever 9 slidably engages in the slot 47. Therefore, the view finder angle adjusting means 5 is driven in the same way with the example of FIGS. 3(a) and (b).

What is claimed is:

1. In a lens-adjustable flash camera comprising a photographic lens, shutter means, a film containing means, a view finder, a built-in flash lamp means including a gas-discharge lamp and electric circuit for said flash lamp means, the improvement is that the camera further comprises:

a lens-adjusting means which comprises an auxiliary lens means for adjusting focal length, said auxiliary lens means movably installed in a manner to slide into a first position in front of said photographic lens and out of said position to a second position to rest, a view finder angle adjusting means which comprises an optical panel which is installed in a manner to slide into a third position in front of said view finder and out of said position to a fourth position to rest, said fourth position being situated substantially in front of said second position of said lens-adjusting means, and said optical panel comprising optical means for changing view finder angle of said view finder by being placed in front of said view finder, a linkage means which comprises a lever pivotted by a fulcrum on a case of the camera, one end of said lever having a sliding means to slidingly engage a path on said view finder angle adjusting means, said path being vertical to the sliding direction of said view finder angle adjusting means, and a connecting rod pivotted at one end thereof to the other end of said lever and at the other end thereof to a point on said auxiliary lens means, whereby said linkage means sets said optical panel in said third position when said auxiliary lens means is set in said first position and resets said optical panel to said fourth position when said auxiliary lens means is reset to said second position, by moving them in opposite directions respectively, and a beam angle adjusting means for adjusting the angle of light of said built-in flash lamp for obtaining an appropriate angle responsive to said photographing angle.

2. A lens-adjustable flash camera of claim 1 wherein said auxiliary lens means comprises a telescopic-conversion lens and
said optical panel is a frame which masks a specified peripheral part of image of said view finder.

3. A lens-adjustable flash camera of claim 1 wherein said auxiliary lens means comprises a lens which, when combined with said photographic lens, focuses to photograph a more distant object than that without the use of said auxiliary lens means.

4. A lens-adjustable flash camera of claim 1 wherein said optical panel comprises a lens for widening said view finder angle when placed in front of said view finder.

5. A lens-adjustable flash camera of claim 4 wherein said path is a slot vertical to the sliding direction of said view finder angle adjusting means and
said sliding means is a pin which slidably engages in said slot.

6. A lens-adjustable flash camera of claim 1 wherein said auxiliary lens means comprises a wide-angle conversion lens.

7. A lens-adjustable flash camera of claim 1 which further comprises an electric indication means to indicate erroneous operation of said beam angle adjusting means with respect to linked operations of said lens adjusting means and said view finder angle adjusting means.

8. A lens-adjustable flash camera of claim 7, wherein said electric indication means is a lighting means energized by a current fed through an exclusive-OR logic gate, which receives input signals from limit switches for detecting positions of said lens-adjusting means and said beam angle adjusting means, respectively.

* * * * *